March 4, 1924.

W. A. TURBAYNE

GENERATOR SYSTEM

Original Filed Nov. 8, 1919      3 Sheets-Sheet 1

1,485,743

WITNESS:

INVENTOR.
William A. Turbayne.
BY
ATTORNEY.

March 4, 1924.                                                    1,485,743
W. A. TURBAYNE
GENERATOR SYSTEM
Original Filed Nov. 8, 1919        3 Sheets-Sheet 3

WITNESS:
Stewart Holmes
Ralph Munden

INVENTOR.
William A. Turbayne
BY
Raymond H. Van Vleck
ATTORNEY.

Patented Mar. 4, 1924.

1,485,743

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

GENERATOR SYSTEM.

Application filed November 8, 1919, Serial No. 336,707. Renewed July 6, 1923.

*To all whom it may concern:*

Be it known that I, WILLIAM A. TURBAYNE, a citizen of the United States, residing at Niagara Falls, in the county of Niagara and State of New York, have invented new and useful Improvements in Generator Systems, of which the following is a specification.

The present invention relates to generator systems.

More particularly the present invention relates to systems having a plurality of circuits which operate at different voltages. An example of such systems is one involving a generator and a storage battery and translation circuit, said generator being designed to charge said battery and supply the demands of the translation circuit at certain times, the battery being adapted to supply the translation circuit at other times.

An object of the present invention is to provide a novel system involving a generator adapted to simultaneously supply a storage battery circuit and a translation circuit and which will inherently maintain a substantially constant voltage across said translation circuit.

A further object is to provide a construction of the kind above referred to which is simple and sturdy and little liable to get out of order.

A further object is to provide a system involving a self-exciting generator which will maintain a substantially constant voltage across one set of brushes regardless of load changes, while maintaining a different voltage across a second set of brushes.

A further object is to provide a system involving a generator, a storage battery and a translation circuit in which the voltage on the translation circuit will be maintained substantially constant without the ordinary regulating devices, throughout large variations in load, whether said generator or battery, or both the generator and battery are supplying the current for said translation circuit.

Further objects will appear as the description proceeds.

The present invention has been illustrated herein in simple form for the purpose of simplifying the description. A bi-polar field structure is disclosed. It will be evident, however, that the number of poles may be multiplied as desired, so long as the electrical and mechanical relations are maintained. According to the machine illustrated, a field structure sets up a main magnetic flux threading the armature. Means are also provided for setting up a flux for modifying the main flux.

Figure 5:
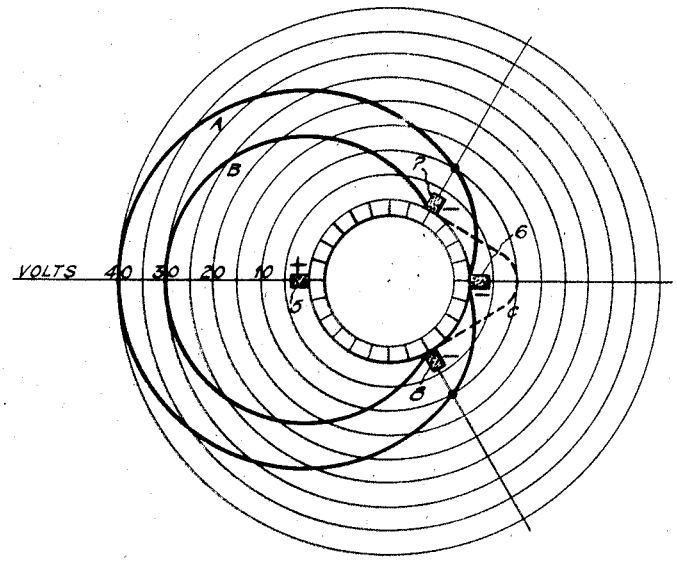

Fig. 5 is a polar diagram illustrating the distribution of E. M. F.'s around the armature under different conditions of operation.

Figure 6:
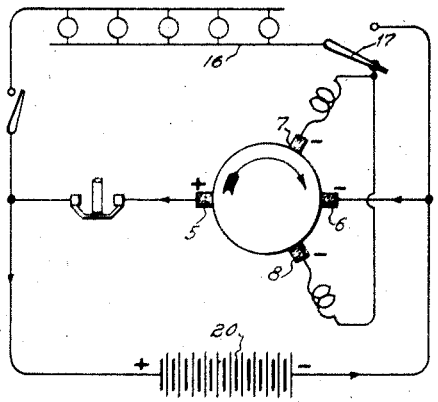

Fig. 6 is a diagrammatic view illustrating conditions when the generator is operative but the translation circuit is disconnected.

Figure 7:
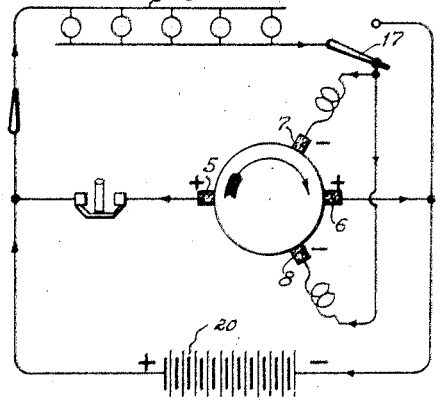

Fig. 7 is a similar view illustrating conditions when a heavy load is placed upon the translation circuit.

Figure 1:
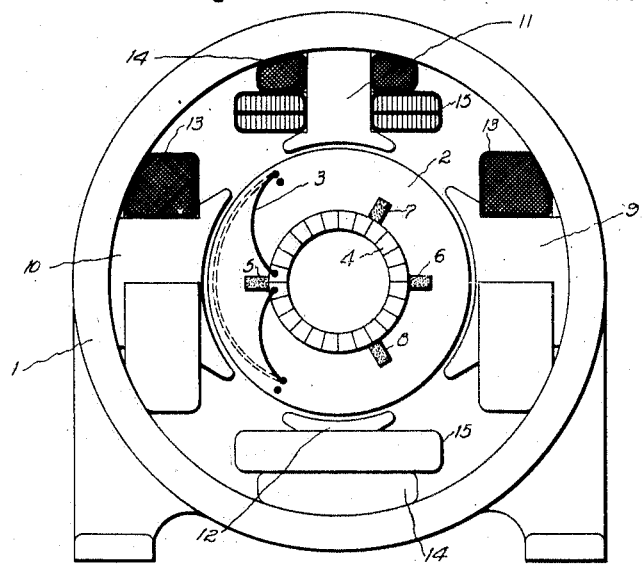
Fig. 1 represents a dynamo-electric machine employed in a system according to the present invention.
Figure 2:
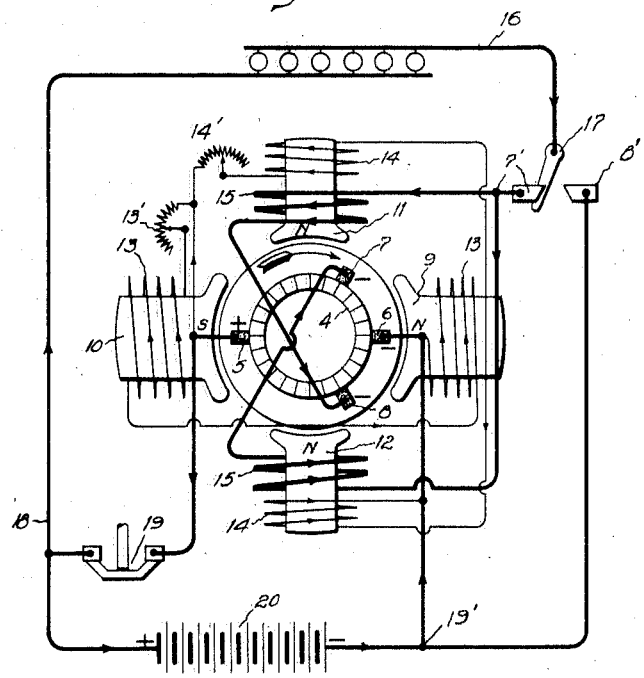
Fig. 2 represents a system embodying the present invention.
Figure 8:
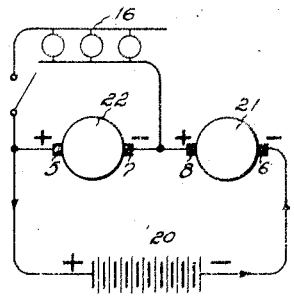
Figure 9:
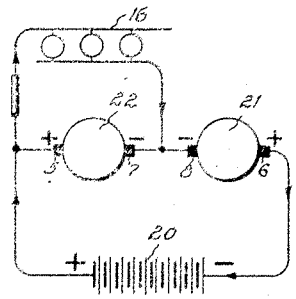

Figs. 8 and 9 are diagrammatic views illustrating the action of the dynamo-electric machine shown in Figs. 1 and 2.

Figure 10:
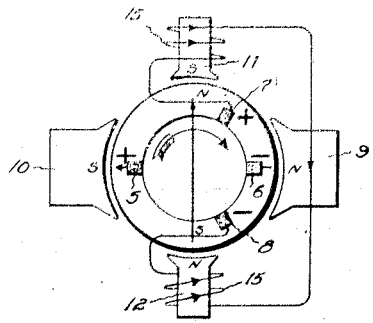
Figure 11:
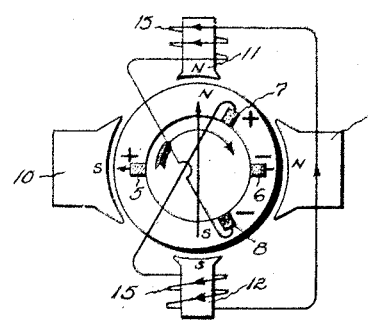

Figs. 10 and 11 are simplified views which illustrate the reasons why certain brush connections are considered advisable.

Referring first to Figs. 1 and 2, the field frame of the dynamo-electric machine is indicated by the numeral 1. Said dynamo-electric machine is provided with armature 2 having conductors 3 arranged to form coils. The ends of each coil are connected by symmetrically arranged end connectors to adjacent bars on the commutator 4. Fig. 1 illustrates only one of these coils, but it will be understood, of course, that additional coils are distributed around the armature. Bearing on the commutator 4 are a pair of brushes 5 and 6. Said brushes 5 and 6 are arranged 180 electrical degrees apart with reference to the main field flux, which will be described hereinafter, and are connected to supply field excitation for the machine. Said brushes, with the symmetrically arranged end connectors for the armature conductors, will be located in line with the main field flux and will connect with the armature at points of maximum potential difference, due to rotation in said field. Arranged substantially 60 degrees on either side of brush 6, are brushes 7 and 8, which are connected through certain field windings, which will be described hereinafter, to a switch contact 7'. Said switch contact 7', as described hereinafter, may be connected through the translation circuit to the brush 5. Placed opposite to switch contact 7' is switch contact 8'.

The field frame 1 has a pair of pole pieces 9 and 10 which are diametrically arranged on opposite sides of armature 2. Spaced midway between said pole pieces 9 and 10 are the modifying pole pieces 11 and 12. Main pole pieces 9 and 10 are provided with field windings 13, 13, while each of the modifying pole pieces 11 and 12 may be provided with a pair of windings 14 and 15. As will be pointed out hereinafter, the windings 14, 14 may be omitted in certain types of systems employing relatively low voltage, as for instance, those commonly referred to as farm lighting systems. It will be noted that the main field windings 13, 13 are connected between brushes 5 and 6, through the adjustable resistance 13'. Field windings 14, 14 are also connected across brushes 5 and 6, said connection being made through adjustable resistance 14'.

The translation circuit is indicated by the numeral 16 and is connected to the switch contact 7' through the switch 17. The other side of translation circuit 16 is connected to the point 18 through which the circuit may be traced through the switch 19 to brush 5. Circuit may be traced from brush 5, through switch 19 to point 18, translation circuit 16, switch 17, thence in two paths, leading through coils 15, 15 to brushes 7 and 8.

Brush 6 is connected to the point 19', which point 19' is connected to one side of the storage battery 20, the other side of which storage battery is connected to the point 18. Said point 19' is also connected to the switch contact 8'. It will be noted that the storage battery 20 is connected across brushes 5 and 6 through switch 19. Switch 19 may be an automatic switch. Such switches are well known and need not be described herein, it being sufficient to state that said switch will automatically close and be held closed whenever the armature 2 is developing a voltage equal to or greater than the C. E. M. F. of the storage battery 20. When the voltage developed by said armature 2 is less than the battery voltage, said switch will be open. As will be noted from Fig. 2, the storage battery 20 may be connected to supply the translation circuit 16 directly by moving switch 17 into engagement with contact 8'. Said switch 17 may be manually operated or may be controlled automatically, whereby the switch 17 will be moved into engagement with contact 8' when the generator is inoperative and move into engagement with contact 7' when the generator is operative. Mechanism for operating said switch automatically has not been illustrated, as said mechanism forms no part of the present invention. Suitable means will readily occur to the skilled mechanic.

The coils of the armature have a pitch of 120 electrical degrees relative to the main pole pieces 9 and 10. In the bipolar structure illustrated, the winding pitch will be actually 120 degrees. In case the number of poles is multiplied, the actual pitch of the armature winding will be corespondingly reduced. It will be apparent from a description given hereinafter that the distribution of flux is so modified by modifying poles 11 and 12 that the bipolar structure illustrated will have a distribution of flux through part of said armature, resembling the distribution in a four-pole structure.

In a four-pole structure, the distribution of flux in part of the field frame would resemble the flux distribution in an eight-pole structure. The same proportions will be carried out in constructions having other numbers of poles.

As will appear as the description proceeds, the modifying poles have common polarities. The 120 electrical degree pitch of the armature winding is found to be equally effective in a bipolar or a four-pole field construction.

The coils 13, 13 on the main field pole pieces are wound to produce opposite polarities in said pole pieces. As illustrated, pole piece 9 has a north polarity, while pole piece 10 has a south polarity. Said pole pieces 9 and 10 therefore constitute a bipolar structure in the machine illustrated. Windings 14, 14 and 15, 15 are adapted to modify the flux developed by windings 13, 13.

Figure 4:
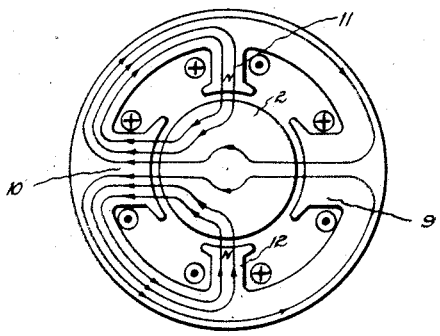
Figs. 3 and 4 are diagrammatic views illustrating the distribution of flux in the field frame and armature under different conditions of operation.
Figure 3:
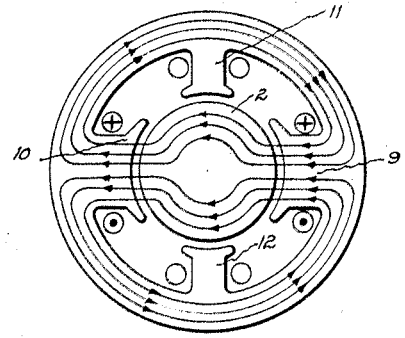

When the work circuit 16 is disconnected, as in Fig. 6, the distribution of flux through the field frame will be as illustrated in Fig. 3, which shows the ordinary distribution of flux in a bipolar structure. When the work circuit is connected as in Fig. 7, and current flows from brush 5, through translation circuit 16 and windings 15, 15, to brushes 7 and 8, the magnetic effect of said windings 15, 15 will materially modify the distribution of flux in the field frame, whereby, under certain conditions of load, the distribution will be as illustrated in Fig. 4. From an inspection of Fig. 4, it will be noted that the magnetization of pole piece 9 is materially reduced, while the magnetization of pole piece 10 is maintained, the difference in magnetization between pole pieces 9 and 10 being taken up by the modifying poles 11 and 12. The modifying effects of windings 15, 15 will vary with the load on the translation circuit 16. It will be noted that the combined effects of the main poles 9, 10 and the modifying poles 11, 12 is to produce a flux distribution through the armature having in one half of said armature an n-pole form and in the other half of said armature a 2n-pole form.

The voltage conditions existing around the commutator on the machine illustrated are indicated by curves A, B and C on the polar diagram, Fig. 5. In order to simplify the description, certain specific figures have been chosen in connection with this polar diagram. Curve A represents conditions of no load or light load upon the translation circuit. At this time the voltage is determined by the voltage of the battery and may be taken as 40 volts. Across brushes 7 and 8 on the one side and brush 5 on the other side, between which the translation circuit 16 is connected, there exists an E. M. F. of 30 volts. Curve B represents conditions when a heavier load is placed upon the translation circuit. In this case the voltage across brushes 7 and 8 on the one side and brush 5 on the other side, is still 30 volts, though the E. M. F. across storage battery brushes 5 and 6 has been reduced to 30 volts. Under very heavy load conditions, such as illustrated in Fig. 7 in which the battery discharges to supplement the action of the generator in supplying the demands of the translation circuit, the distribution of E. M. F. around the commutator may be as illustrated by curve B plus curve C in which the voltage impressed across the storage battery brushes 5 and 6 is reduced to 30 minus 10, or 20 volts, while the voltage across brushes 7 and 8 on the one side and brush 5 on the other, between which brushes the translation circuit is connected, is still maintained at substantially 30 volts.

In the above description of the curves in polar diagram illustrated in Fig. 5, no mention has been made of the modifying effects of windings 14, 14 which are connected across brushes 5 and 6. Said coils 14, 14, with rheostat 14', may be provided for the purpose of setting the voltage to be held constant across brushes 5—7 and 5—8.

Referring now to Figs. 8 and 9, it will be explained why the dynamo-electric machine illustrated in Figs. 1 and 2 has a very considerable flexibility, such as may be had with two dynamo-electric machines. As illustrated in Fig. 8, which shows conditions where no load is placed upon the translation circuit 16, all of the armature conductors act cumulatively to supply the voltage required to charge the storage battery 20. Under conditions of heavy load on translation circuit 16, certain of the armature conductors, to wit, those between brushes 7—6 and 8—6, set up E. M. F.'s which act cumulatively with that of the battery 20 to cause the battery to discharge to maintain normal voltage on the translation circuit. In said diagrams, Figs. 8 and 9, those armature conductors embraced between brushes 7 and 6 and 8 and 6 are indicated by the armature 21, the remaining conductors being indicated by armature 22.

Figures 10 and 11 are submitted to explain the reasons for connecting the windings 15, 15 to their corresponding brushes in the manner illustrated in Fig. 2. With the polarities on the main pole pieces 9 and 10 as shown in the drawings, and with an armature rotation as indicated by the arrows, the current in the armature conductors would be in such a direction as to set up a vertical flux illustrated by the vertical arrows in Figs. 10 and 11. This armature cross flux would, by induction, make modifying pole piece 11 of south polarity and modifying pole piece 12 of north polarity. Under the conditions illustrated, brush 7 would have a polarity which is positive relative to brush 8. If the windings 15, 15 were connected to adjacent brushes, as shown in Fig. 10, the following action would occur. By reason of the armature cross flux illustrated by the vertical arrow, a current would flow from brush 7 to brush 8, traversing windings 15, 15 in a direction to accentuate the armature cross flux. On the other hand, by connecting the upper winding 15 to brush 8 and the lower winding 15 to brush 7, these windings 15, 15 not only perform the function above described of modifying the flux to produce inherent regulation, but also act as compensating windings to oppose the flux set up by the armature conductors.

According to the present invention the voltage on the translation circuit may be held up under heavy load conditions with a relatively small and simple construction of generator. The regulation is inherent in its action and there is very little likelihood that the parts will get out of order.

One embodiment of the present invention has been illustrated and described in detail. Many modifications will occur to those skilled in the art. It is intended in this patent to cover all such modifications that come within the scope of the present invention as defined by the appended claims.

What I claim as new and desire to secure by Letters Patent of the United States, is—

1. A system including a double circuit generator, one of said circuits being adapted to charge a storage battery, the other of said circuits being adapted to supply translation devices, said generator having main field poles and modifying poles, said modifying poles being provided with means for distorting the flux through the generator armature in response to the load on said translation circuit to hold up the voltage on said translation devices under load increases.

2. In combination, a battery, a translation circuit and a generator having a plurality of brushes, main field poles, a pair of said brushes being located at points of maximum potential difference due to armature rotation on open circuit in the flux produced by said main field poles, the other of said brushes being displaced from said points and being connected to one of said pair to supply said translation circuit, said generator being provided with flux modifying means responsive to the load on said translation circuit for distorting the flux through the armature to hold up the voltage on said translation circuit under increases of load.

3. In combination, a generator, a storage battery circuit and a translation circuit, said generator having main poles for setting up a main field flux, other poles for setting up modifying flux in quadrature to said first mentioned flux, an armature, field windings whose excitation is proportional to the load on said translation circuit for exciting said other poles, said field windings being connected to produce common polarity in said other poles to distort the main flux to hold up the voltage on said translation circuit under increases of load.

4. In combination, a battery circuit, a translation circuit and a generator having an armature, windings for setting up a main field flux, modifying windings for setting up modifying flux in quadrature to said first mentioned flux, a pair of brushes for supplying said first mentioned windings, a pair of other brushes spaced from said first mentioned brushes, said last mentioned brushes being connected to one of said first mentioned brushes through said translation circuit and through said modifying windings.

5. In combination, a battery circuit, a translation circuit, and a generator having an armature, windings for setting up main field flux, brushes placed at points of maximum potential difference due to armature rotation on open circuit in said main field flux, said windings being connected across said brushes, a pair of modifying windings each adapted to set up flux in quadrature to said main field flux, other brushes each displaced from one of said first mentioned brushes, each of said last mentioned brushes being connected through one of said modifying windings to one side of said translation circuit, the other side of said translation circuit being connected to the other of said first mentioned brushes.

6. In combination, a battery circuit, a translation circuit, and a generator having an armature, windings for setting up main field flux, brushes placed at points of maximum potential difference due to armature rotation on open circuit in said main field flux, said windings being connected across said brushes, a pair of modifying windings each adapted to set up flux in quadrature to said main field flux, other brushes each displaced from one of said first mentioned brushes, each of said last mentioned brushes being connected through one of said modifying windings to one side of said translation circuit, the other side of said translation circuit being connected to the other of said first mentioned brushes, each of said modifying windings being connected to their corresponding brushes to provide a local circuit which opposes armature reaction.

7. In combination, a generator, a storage battery circuit and a translation circuit, said generator having main poles for setting up a main field flux, other poles for setting up modifying flux in quadrature to said first mentioned flux, an armature, field windings whose excitation is proportional to the load on said translation circuit for exciting said other poles, said field windings being connected to produce common polarity in said other poles to distort the main flux to hold up the voltage on said translation circuit under increases of load, said armature having a winding pitch of 120 electrical degrees.

8. In combination, a battery circuit, a translation circuit and a generator having an armature, windings for setting up a main field flux, modifying windings for setting up modifying flux in quadrature to said first mentioned flux, a pair of brushes for supplying said first mentioned windings, a pair of other brushes spaced from said first mentioned brushes, said last mentioned brushes being connected to one of said first mentioned brushes through said translation circuit and through said modifying windings, said armature having a winding pitch of 120 electrical degrees.

9. In combination, a battery circuit, a translation circuit, and a generator having an armature, windings for setting up main field flux, brushes placed at points of maximum potential difference due to armature rotation on open circuit in said main field flux, said windings being connected across said brushes, a pair of modifying windings each adapted to set up a flux in quadrature to said main field flux, other brushes each displaced from one of said first mentioned brushes, each of said last mentioned brushes being connected through one of said modifying windings to one side of said translation circuit, the other side of said translation circuit being connected to the other of said first mentioned brushes, said armature having a winding pitch of 120 electrical degrees.

10. In combination, a generator, a storage battery circuit and a translation circuit, said generator having main poles for setting up a main field flux, other poles for setting up modifying flux in quadrature to said first mentioned flux, an armature, field windings whose excitation is proportional to the load on said translation circuit for exciting said other poles, said field windings being connected to produce common polarity in said other poles to distort the main flux to hold up the voltage on said translation circuit under increases of load, said other poles being provided with windings for determining the voltage on said translation circuit.

11. In combination, a generator, a storage battery circuit and a translation circuit, said generator having main poles for setting up a main field flux, other poles for setting up modifying flux in quadrature to said first mentioned flux, an armature, field windings whose excitation is proportional to the load on said translation circuit for exciting said other poles, said field windings being connected to produce common polarity in said other poles to distort the main flux to hold up the voltage on said translation circuit under increases of load, said other poles being provided with windings for determining the voltage on said translation circuit, said last mentioned windings being connected across said first mentioned brushes.

12. A system including a double circuit generator, one of the circuits thereof being connected to charge a storage battery, the other of the circuits thereof being connected to supply translation devices, said generator having an armature, main field poles and modifying poles for setting up a flux distribution through said armature having in one half of said armature an $n$-pole form and in the other half of said armature a $2n$-pole form, said modifying poles being provided with means for distorting the flux through the generator armature in response to the load on said translation devices to hold up the voltage on said translation devices under load increases.

13. In combination, a battery circuit, a translation circuit and a generator having an armature, main field windings and modifying windings for co-operating with said main field windings to set up a flux distribution through said armature having in one half of said armature an $n$-pole form and in the other half of said armature a $2n$-pole form, said modifying windings being connected to be responsive to the load on said translation circuit.

14. In combination, a battery circuit, a translation circuit and a generator having an armature, main field windings and modifying windings for co-operating with said main field windings to set up a flux distribution through said armature having in one half of said armature an $n$-pole form and in the other half of said armature a $2n$-pole form, said armature having a pair of brushes for supplying said main field windings, a pair of other brushes spaced from said first mentioned brushes, said last mentioned brushes being connected to one of said first mentioned brushes through said translation circuit and through said modifying windings.

15. In combination, a battery circuit, a translation circuit and a generator having an armature, main field windings and modifying windings for co-operating with said main field windings to set up a flux distribution through said armature having in one half of said armature an $n$-pole form and in the other half of said armature a $2n$-pole form, said armature having brushes placed at points of maximum potential difference due to armature rotation on open circuit in the flux produced by said main field windings, said main field windings being connected across said brushes, other brushes each displaced from one of said first mentioned brushes, each of said last mentioned brushes being connected through one of said modifying windings to one side of said translation circuit, the other side of said translation circuit being connected to the other of said first mentioned brushes.

In witness whereof, I have hereunto subscribed my name.

WILLIAM A. TURBAYNE.